US008832788B1

(12) United States Patent
Gibson et al.

(10) Patent No.: US 8,832,788 B1
(45) Date of Patent: Sep. 9, 2014

(54) AUTOMATED HUMAN ASSISTED AUTHENTICATION

(75) Inventors: Douglas E. Gibson, Newton, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 29 days.

(21) Appl. No.: 13/286,989

(22) Filed: Nov. 1, 2011

(51) Int. Cl.
*G06F 7/04* (2006.01)
*G06F 17/00* (2006.01)
*H04L 29/06* (2006.01)
*G06F 21/00* (2013.01)

(52) U.S. Cl.
USPC ............ 726/2; 726/1; 726/4; 726/27; 726/28; 713/155; 713/182; 713/183

(58) Field of Classification Search
USPC ........... 726/1, 2, 4, 27, 28; 713/155, 182, 183
See application file for complete search history.

(56) References Cited

U.S. PATENT DOCUMENTS

| 8,291,477 B2 * | 10/2012 | Lunt .................................. 726/4 |
| 2005/0198534 A1 * | 9/2005 | Matta et al. .................. 713/201 |
| 2010/0180032 A1 * | 7/2010 | Lunt .............................. 709/225 |
| 2010/0257357 A1 * | 10/2010 | McClain ........................ 713/155 |
| 2011/0012732 A1 * | 1/2011 | Farkash et al. ................ 340/540 |
| 2012/0137257 A1 * | 5/2012 | Lalancette et al. ............ 715/846 |
| 2012/0144461 A1 * | 6/2012 | Rathbun ........................... 726/5 |
| 2013/0073975 A1 * | 3/2013 | Bladel et al. .................. 715/739 |

* cited by examiner

*Primary Examiner* — Mohammad W Reza
(74) *Attorney, Agent, or Firm* — Lowenstein Sandler LLP (57) ABSTRACT

A server computing system receives a request to authenticate the identity of a user. The user may wish to perform an action that requires the user's identity to first be verified. In response to the request, the server computing system automatically contacts trusted associates that are listed in policy data for the user and determines whether the trusted associates validate the identity of the user. The server computing system provides one-time passwords to the user for the trusted associates that have validated the identity of the user. Subsequently, the user can combine the one-time passwords to form an authentication password, which can be used to determine whether the user is allowed to perform the action.

17 Claims, 5 Drawing Sheets

AUTOMATED HUMAN ASSISTED AUTHENTICATION

TECHNICAL FIELD

Embodiments of the present invention relate to authentication of a user identity. Specifically, the embodiments of the present invention relate to automated human assisted authentication.

BACKGROUND

There are various mechanisms for authenticating people. For example, enterprises can control user access to enterprise applications, such as web applications, by authenticating users via user credentials, such as a username and password. Various scenarios may require strong authentication, also known as second-factor authentication, which requires a user to provide additional evidence of who they are, for example, via a one-time password, a digital certificate (e.g., public key infrastructure (PKI) certificate), a fingerprint, etc. For instance, it is very common for users to forget or lose their authentication credentials (e.g. passwords), which results in the user's inability to access systems to which they should have access privileges (e.g., company networks, financial sites, and online commerce sites). Other scenarios which may require strong authentication can include a person may replace a mobile phone that generates one-time passwords, a user may wish to access restricted data, and a system administrator may wish to shut down several of the enterprise servers for maintenance. Such actions may require strong authentication before a user can obtain a new password, register a new mobile phone, access restricted data, shut down the servers, etc.

Traditional authentication solutions require the use of expensive sensing equipment (e.g. retina scanner, fingerprint recorder) and/or are unavailable in settings such as the customer connecting at home over the Internet. Other conventional authentication solutions request additional identifying information from the user (e.g. mother's maiden name, pet's name, etc.), either previously provided by the user or found independently. While this provides a certain level of assurance the person is who they say they are, it has limitations, even when the end user is able to specify their own questions and answers. A great deal of information that could be used for these qualifying questions may be publicly available from social networking sites, services and search engines designed to supply personal information, attained through social engineering, or other sources.

SUMMARY

In one embodiment, a system for providing automated human assisted authentication is described. An exemplary system may include a memory and a processor that is coupled to the memory. In one embodiment, the system receives a request to initiate authentication of identity of a user and automatically contacts trusted associates for the user based on the policy data in response to the request. The system determines whether the trusted associates validate the identity of the user and provides one-time passwords to the user for trusted associates that have validated the identity of the user. The one-time passwords provided to the user are subsequently combined to form an authentication password used to determine whether the user is allowed to perform an action.

In one embodiment, the system determines whether the trusted associates validate the identity of the user by establishing independent communication between each of the trusted associates with the user and receiving user input from the trusted associates indicating whether a trusted associate has received a correct answer from the user to a question asked by the trusted associate. In one embodiment, the system establishes independent communication between each of the trusted associates with the user by establishing voice communication and/or voice communication.

In one embodiment, the system further receives user input of the one-time passwords collected by the user, determines whether the received one-time passwords match one-time passwords stored in a data store, and grants authorization to the user to perform an action based on a determination that there is a match and denies authorization to the user to perform an action based on a determination that there is not a match.

In one embodiment, the system automatically contacts the trusted associates for the user based on policy data by randomly selecting the trusted associates based on user account data of the user stored in a data store. In one embodiment, the system automatically contacts the trusted associates by establishing voice communication and/or video communication with a trusted associate. In one embodiment, the system provides one-time passwords to the user by removing a trusted associate from communication with the user to establish private communication between the server computing system and the user to deliver the one-time password to the user.

In addition, a non-transitory computer readable storage medium for providing automated human assisted authentication is described. An exemplary non-transitory computer readable storage medium includes instructions that will cause a processor to receive a request to initiate authentication of identity of the user, automatically contact trusted associates for the user based on policy data in response to the request, determine whether the trusted associates validate the identity of the user, and provide one or more one-time passwords to the user for trusted associates that have validated the identity of the user. Further, a method for providing automated human assisted authentication is described. In one embodiment, a method comprises receiving a request to initiate authentication of identity of the user, automatically contacting a plurality of trusted associates for the user based on policy data in response to the request, determining whether the trusted associates validate the identity of the user and providing one or more one-time passwords to the user for trusted associates that have validated the identity of the user. The one-time passwords provided to the user are subsequently combined to form an authentication password used to determine whether the user is allowed to perform an action.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for providing automated human assisted authentication. A server computing system receives a request to authenticate the identity of a user. The user may wish to perform an action that requires the user's identity to first be verified. In response to the request, the server computing system automatically contacts trusted associates that are listed in policy data for the user and determines whether the trusted associates validate the identity of the user. The server computing system provides one-time passwords (OTP) to the user for the trusted associates that have validated the identity of the user. Subsequently, the user can combine the one-time passwords to form an authentication password, which can be used to determine whether the user is allowed to perform the action.

Embodiments provide a mechanism for highly accurate and reliable authentication of people based on recognition through conversation with previously specified friends or associates. While it is extremely difficult for a machine based system to positively identify people, it is quite easy for humans to identify other individuals they know even by voice conversation alone. Embodiments use human-to-human identification through conversation to provide highly accurate and reliable authentication.

Figure 1:
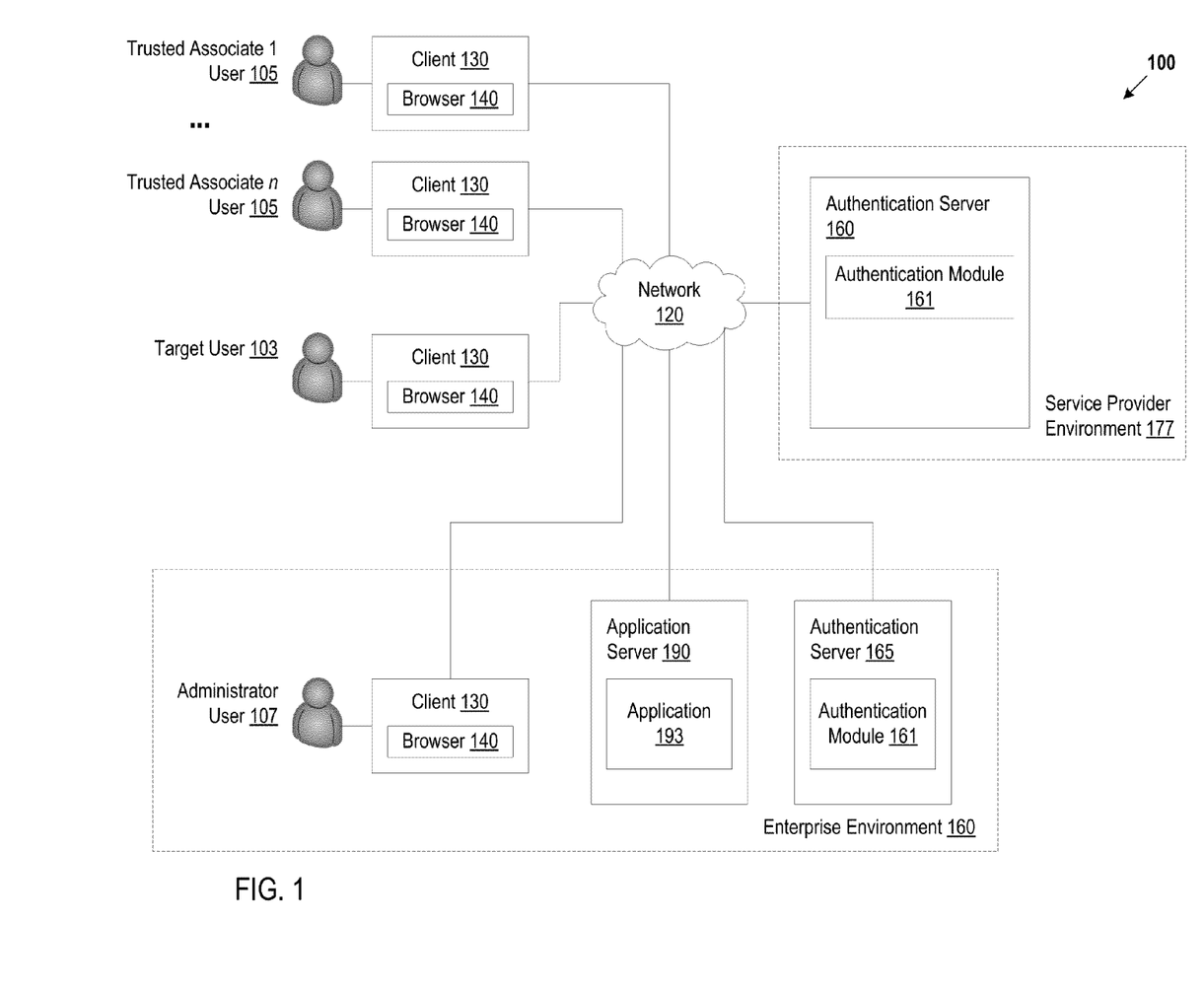
FIG. 1 is an exemplary network architecture in which embodiments of the present invention may operate.

FIG. 1 is an exemplary network architecture 100 in which embodiments can be implemented. The network architecture 100 can include an authentication server 160 communicating with one or more users 103, 105, 107 via one or more clients 130 over one or more networks 120, according to one embodiment. A network 120 can be a local area network (LAN), a wireless network, a telephone network, a mobile communications network, a wide area network (WAN), such as the Internet, or similar communication system.

An authentication server 160 can authenticate the identity of a user 103. A user whose identity is being authenticated is hereafter referred to as a 'target user.' An authentication server 160 can be hosted by any type of computing device including server computers, gateway computers, desktop computers, laptop computers, hand-held computers or similar computing device. In one embodiment, an authentication server 160 can be provided by and maintained within a service provider environment 177. There can be more than one authentication server 160.

In one embodiment, an authentication server 160 can include an authentication module 161 to provide human assisted authentication to authenticate the identity of a target user 103. In another embodiment, an enterprise environment 160 can include an on-premise authentication server 165 that is maintained by the enterprise, and the authentication server 165 can communicate with the authentication module 161 hosted in the authentication service provider environment 177 for human assisted authentication via a network 160. In another embodiment, the authentication server 165 can host an authentication module 161 within the enterprise environment 160 to authenticate the identity of a target user 103.

The enterprise environment 160 can include one or more application servers 190 to host one or more applications 163 accessible by clients 130 via the network 120. An application server 190 can be hosted by any type of computing device including server computers, gateway computers, desktop computers, laptop computers, hand-held computers or similar computing device. An application 163 can be any type of application including, for example, a web application, a desktop application, a database management application, etc. For example, the application 163 is an Internet banking application. A client 130 can be hosted by any type of computing device including server computers, gateway computers, desktop computers, laptop computers, mobile communications devices, cell phones, smart phones, hand-held computers, tablet, or similar computing device. A client 130 can host a web browser 140, or similar application (e.g., mobile device application, tablet application), to access an application 163 and to communicate with the authentication module 161 via the network 120.

The authentication module 161 can receive a request to initiate a human assisted authentication session to authenticate the identity of a target user 103. For example, a target user 103 wishes to login to application 193 (e.g., Internet banking application), but has forgotten his/her login password. The identity of the target user 103 should be authenticated prior to the target user 103 receiving a new password or being able to reset his/her password. The target user 103 can send a request to initiate a human assisted authentication session to an authentication module 161 via the client 130. A target user 103 may initiate a human assisted authentication session with the authentication module 161 using a browser 140, or other application software capable of communicating the authentication module 161. In another embodiment, the authentication module 161 receives a request from an application.

The authentication module 161 can receive the request and can contact at least two trusted associates 105 corresponding to the target user 103 to verify that the target user 103 is who he/she claims to be. A trusted associate 105 is a person who can be relied on to give a positive identification of the target user 103 after engaging with the target user 103 in a voice or in person conversation. Examples of trusted associates 105 can include, and are not limited to, friends, relatives, coworkers, and colleagues. The number of trusted associates 105 for the authentication module 161 to contact and the communication mechanism (e.g., telephone, email, text messaging, instant messaging) to use to contact the trusted associates 105 can be based on policy data specified by an administrator user 107 and/or policy data specified by a target user 103. For example, an enterprise administrator user 107 may specify system level policy data that requires a target user 103 to provide at least five trusted associates and at least three of the five trusted associates should validate the identity of the target user 103 before the target user 103 can reset his/her password. One embodiment for specifying policy data is described in greater detail below in conjunction with FIG. 2.

The authentication module 161 can provide a one-time password to the target user 103 for each trusted associate 105 that validates the identity of the target user 103. A one-time password is a password that is valid for one session. Subsequently, the target user 103 can use the collected one-time passwords as an authentication password, for example, to receive a new password or resetting his/her existing password.

Figure 2:
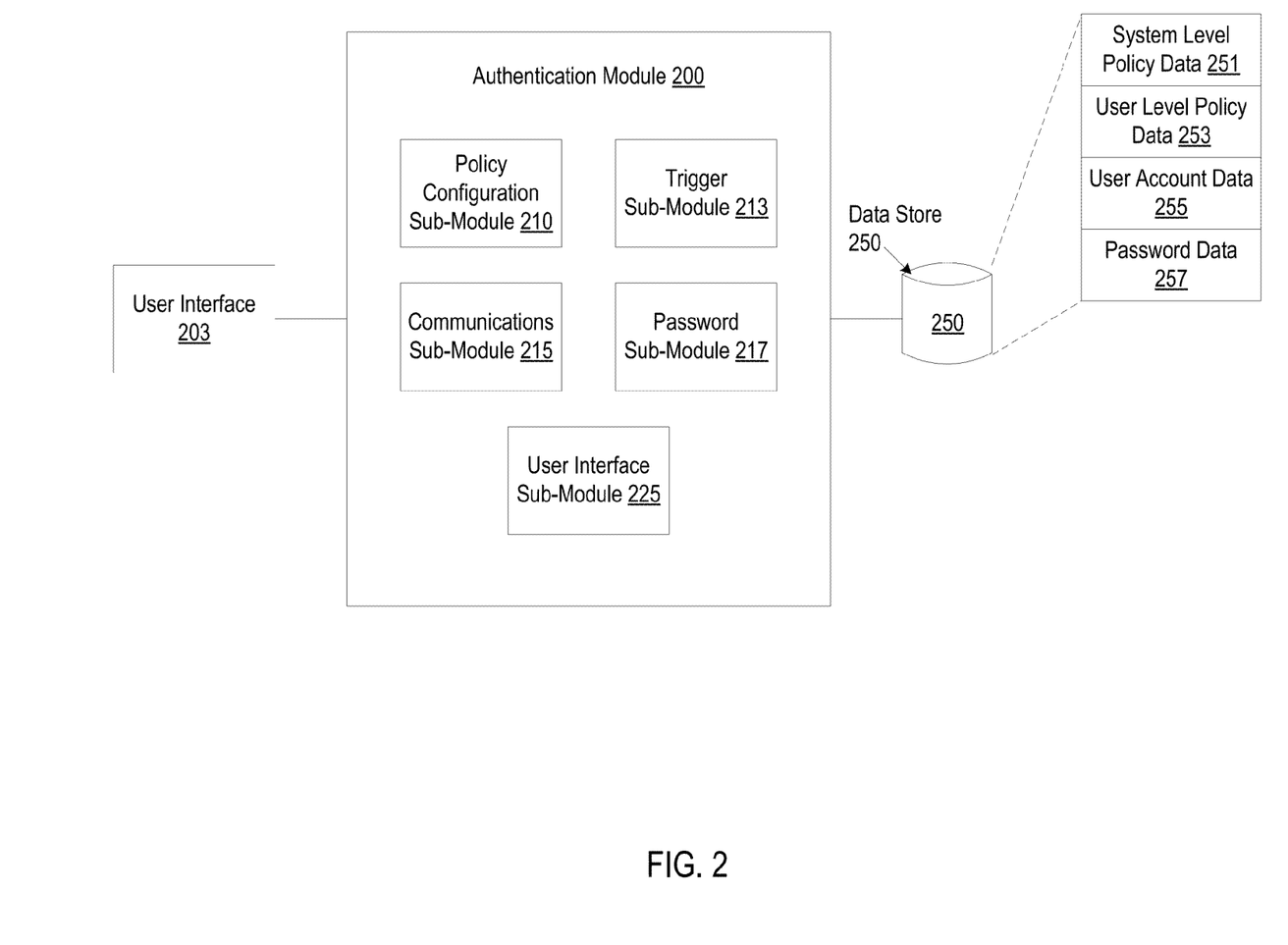
FIG. 2 is a block diagram of one embodiment of an authentication module for providing automated human assisted authentication.

FIG. 2 is a block diagram of one embodiment of an authentication module 200 for providing automated human assisted authentication. The authentication module 200 may be the same as the authentication module 161 hosted by an authentication server 160 and the authentication module 161 hosted by an authentication server 165 in FIG. 1. The authentication module 200 includes a policy configuration sub-module 210, a trigger sub-module 213, a communications sub-module 215, a password sub-module 217, and a user interface sub-module 225. The sub-modules can be combined together or separated in further sub-modules, according to a particular embodiment.

The policy configuration sub-module 210 can receive user input from a user via a user interface 203 to setup policies. The user interface 203 can be a graphical user interface (GUI). The user interface (UI) generation sub-module 225 can generate a GUI to receive the user input. A user can be an administrator user (e.g., administrator user 107 in FIG. 1) that provides user input to define system level policies. The system level policies can be stored as system level policy data 251 in a data store 250 that is coupled to the authentication module 200. The system level policy data 251 can specify, for example, events that initiate human assisted authentication, the number of trusted associates to be used to authenticate a target user, the number of identity validations to be obtained, and the type of communication to be used for the authentication. Examples of events that initiate human assisted authentication can include, and are not limited to, resetting a password, replacing a lost security identification key, replace a mobile phone number being used for second factor authentication, accessing data, and performing an action, such as a system administrator action (e.g., shut down servers).

A user can be a user requesting authentication of his/her identity or the identity of another user and can provide configuration data via the user interface 203 to setup and configure user level policies. The user level policies can be stored as user level policy data 253 in the data store 250. The user level policy data 253 can specify, for example, user preferences for triggers for human assisted authentication, the number of trusted associates to be used to authenticate a target user, the number of identity validations to be obtained, and the type of communication to be used for the authentication.

The policy configuration sub-module 210 can be configured to override system level policy data 251 with user level policy data 253 and vise-versa. For example, the system level policy data 251 may specify that a target user should provide at least five trusted associates and at least three of the five trusted associates should validate the identity of the target user. The user level policy data 253 for a particular target user may specify that the target user should have a minimum of eight trusted associates corresponding to his/her user account and at least four trusted associates should validate the identity of the target user. The policy configuration sub-module 210 can be configured to use the stricter policy data.

The policy configuration sub-module 210 can receive user input from a user via a user interface 203 to setup a user account for the user and store user account data 255 in the data store 250. The user account data 255 can include data for more than one user. Examples of user account data 255 can include, and are not limited to, trusted associate identifiers (e.g., name, unique identifier, etc.), contact information for the trusted associates (e.g., email address, telephone numbers, video calling identifier, etc.), preferred mode of communication, preferred hours of communication, and availability status. The policy configuration sub-module 210 can periodically update the user account data 255. For example, the policy configuration sub-module 210 can request updated information from a user via a message (e.g., telephone message, email message, text message, and instant message).

The trigger sub-module 213 can receive a request to initiate authentication of the identity of a target user. The request can be from an application and/or a user. The request can be received as input to trigger a human assisted authentication session. Examples of input can include, and are not limited to, selection of a menu option via a phone call (e.g., detecting a particular dual-tone multi-frequency (DTMF) signal, voice recognition of a menu selection), an Internet event (e.g., a user clicking a button on a website), a text message, and instructions from an authentication system (e.g., an enterprise authentication system). The request can include a user identifier for the target user whose identity is to be validated.

The communications sub-module 215 can privately establish a specific type of communication with a target user, can privately establish a specific type of communication with each of the selected trusted associates, and can independently establish communication between the target user and each of the selected trusted associates in response the trigger sub-module 213 detecting a trigger. A private communication between the communications sub-module 215 and a target user is a communication without any other party connected other than the target user. A private communication between the communications sub-module 215 and a trusted associate is a communication without any other party connected other than the trusted associate. Examples of the types of communication used by the communications sub-module 215 can include, and are not limited to, communication via a local area network (LAN), a wireless network, a telephone network, a mobile communications network, a wide area network (WAN), such as the Internet, or similar communication system. The communications sub-module 215 can establish a specific type of communication based on system level policy data 251, user level policy data 253 and user account data 255 corresponding to the user identifier in the request, or a combination of such. The communications sub-module 215 can include a speech synthesizer to communicate with user and trusted associates. The speech synthesizer can be implemented as hardware or instructions executed by a processor.

The password sub-module 215 can generate one-time passwords (OTP) for the number of trusted associates that should validate the identity of a target user for a human assisted authentication session based on the policy data (e.g., system level policy data 251, user level policy data 253). For example, the user level policy data 253 for a particular target user specifies that at least four trusted associates should validate the identity of the target user, and the password sub-module 215 generates an OTP for each of the four trusted associates that validate the target user. The password sub-module 215 can use an algorithm to generate an OTP. Examples of algorithms can include, and are not limited to, a time-synchronization algorithm, an algorithm based on a previously generated OTP, and an algorithm based on a random number. The password sub-module 215 can deliver an OTP to a target user. Example mechanisms for delivering an OTP can include, and are not limited to, text message, mobile device application, instant message, website, email, voice message, and voice application. The password sub-module 215 can deliver an OTP to a target user privately, such that the OTP is known only to the target user.

The password sub-module 215 can store password data 257 in the data store 250. Subsequently, a target user can provide the OTPs to the password sub-module 215 and the password sub-module 215 can validate the OTPs received from the target user using the password data 255 stored in the data store 250. The password data 255 can be used to determine whether the received OTPs are valid such that a target user can continue with a desired action (e.g., reset a password, replace a lost secure identification key, replace a mobile phone number being used for second factor authentication, access data, and perform an action, such as a system administrator action (e.g., shut down servers)). The password data 257 can include copies of the distributed OTPs, algorithms used to generates the OTPs, and algorithms used to combine the distributed OTPs to form an authentication password.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
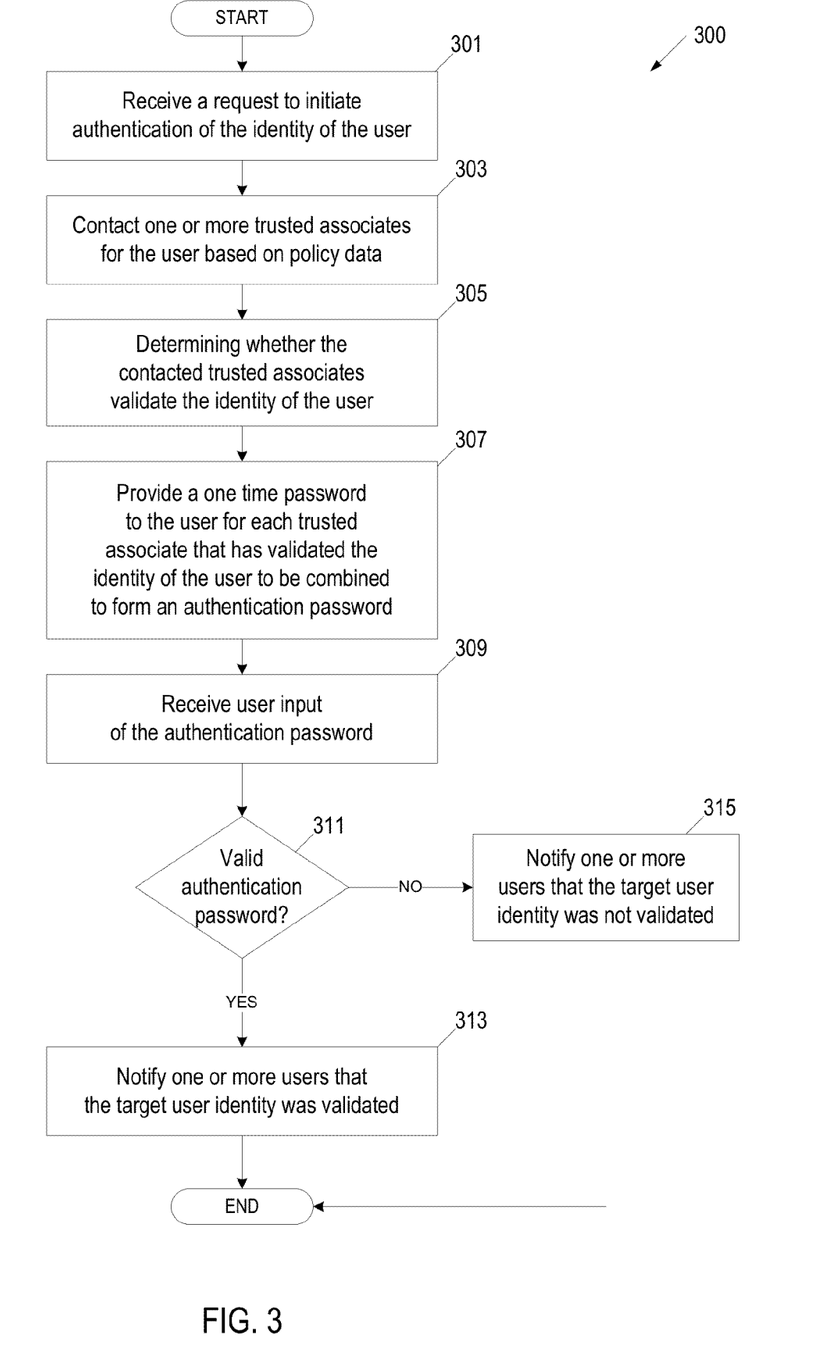
FIG. 3 is a flow diagram of an embodiment of a method for providing automated human assisted authentication.

FIG. 3 is a flow diagram of an embodiment of a method 300 for providing automated human assisted authentication. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by an authentication module 161 in FIG. 1.

At block 301, processing logic receives a request to initiate authentication of identity of the user. The request can be from a user and/or an application. The request can be received as, for example, and is not limited to, a particular dual-tone multi-frequency (DTMF) signal menu selection that is input by the user during a telephone call, an Internet event (e.g., a selection of a button on a website), a text message, and instructions from an authentication system (e.g., an enterprise authentication system).

At block 303, the request triggers processing logic to automatically contact at least two trusted associates for the target user in response to the request based on policy data that is stored in a data store that is coupled to the authentication module. The request can include a user identifier for the target user whose identity is to be validated. Processing logic can use policy data (e.g., system level data, user level data) and/or user account data that is associated with the user identifier in the request to determine how many trusted associates to contact and a preferred mode of communication with the user and the trusted associates. The preferred mode of communication of the trusted associates may vary. One embodiment of contacting the trusted associates is described in greater detail below in conjunction with FIG. 4.

Processing logic can access the user account data for the user and randomly select the trusted associates to contact from the user account data. The user account data can include a list of trusted associates for the user and the contact information for the trusted associates. For example, the user account data includes a list of eight trusted associates for a user and the policy data may specify that three trusted associates should validate the identity of the user. Processing logic can randomly select three of the eight trusted associates. The user account data can include the availability of the trusted associates and processing logic can filter the list of trusted associates and randomly select the trusted associates from the filtered list.

At block 305, processing logic determines whether the contacted trusted associates validate the identity of the user. One embodiment of contacting the trusted associates is described in greater detail below in conjunction with FIG. 4. At block 307, processing logic provides a one-time password to the target user for each trusted associate that has validated the identity of the target user. One embodiment of providing one-time passwords is described in greater detail below in conjunction with FIG. 4. Processing logic can store password data pertaining to the distributed OTPs in the data store that is coupled to the authentication module.

Subsequently, a user can enter the one-time passwords the user has collected as secondary-factor authentication input (e.g., an authentication password). At block 309, processing logic receives the user input from the target user and uses the stored password data to determine whether the secondary-factor authentication input is valid at block 311, such that the user is authorized to perform the desired action. Processing logic can generate and provide a GUI (e.g., authentication website) to receive the user input. In one embodiment, the target user can combine (e.g., concatenate) the collected OTPs to create an authentication password. Processing logic can confirm whether the user input matches the stored password data to allow the user to perform the action (e.g., reset a password, replace a lost secure identification key, replace a mobile phone number being used for second factor authentication, access data, and perform an action, such as a system administrator action (e.g., shut down servers)). For example, processing logic can determine whether the authentication password (e.g., concatenation of OTPs) matches an authentication password in the data store.

If the received secondary-factor authentication password is valid (block 311), processing logic can notify one or more users that the user identity is authenticated at block 313 and the user can proceed with the desired action. The notification indicates that the user is authorized to perform an action. For example, processing logic can send a text message to the target user and a supervisor of the target user indicating that the user identity has been authenticated. The target user may proceed to shut down the enterprise servers. In another example, processing logic can notify the target user by directing the target user to a GUI to reset his/her password.

If the received authentication password is not valid (block 311), processing logic can notify one or more users that the user identity was not authenticated at block 315. For example, processing logic receives an authentication password that is comprised of three OTPs which does not match the authentication password stored in the data store that is comprised of four OTPs. Processing logic can notify the target user, for example, via a GUI, that the user is denied authorization to perform an action and/or that the target user should obtain an additional OTP. In one embodiment, the target user can initiate processing logic to contact another trusted associate to complete the authentication session. In another embodiment, the target user can initiate a new authentication session.

Portions of method 300 can be iterative. The number of iterations can be based on the policy data. The policy data can specify various thresholds, for example, and are not limited to, a number of trusted associates that should validate the user identity, a minimum number of trusted associates to contact, a maximum number of trusted associates to contact, and a maximum number of consecutive failed validations. One embodiment of an iterative method for trusted associates validating a target user identity is described in greater detail below in conjunction with FIG. 4.

For example, the policy data may specify that three trusted associates should validate the identity of the user and processing logic can randomly select three trusted associates. Processing logic can contact a first trusted associate at block 303 and determine whether the first trusted associate validates the user identity at block 305. If the first trusted associate is successful, processing logic can provide an OTP to the user at block 307. Processing logic can then return to block 303 to contact the second trusted associate, even if the first trusted associate was not successful, and determine whether the second trusted associate performs a successful validation at block 305. If the second trusted associate is successful, processing logic can provide an OTP to the user at block 307. Processing logic can continue to contact a next trusted associate until a threshold is met (e.g., number of validations, maximum number of failed validation attempts, maximum number of trusted associates contacted).

Figure 4:
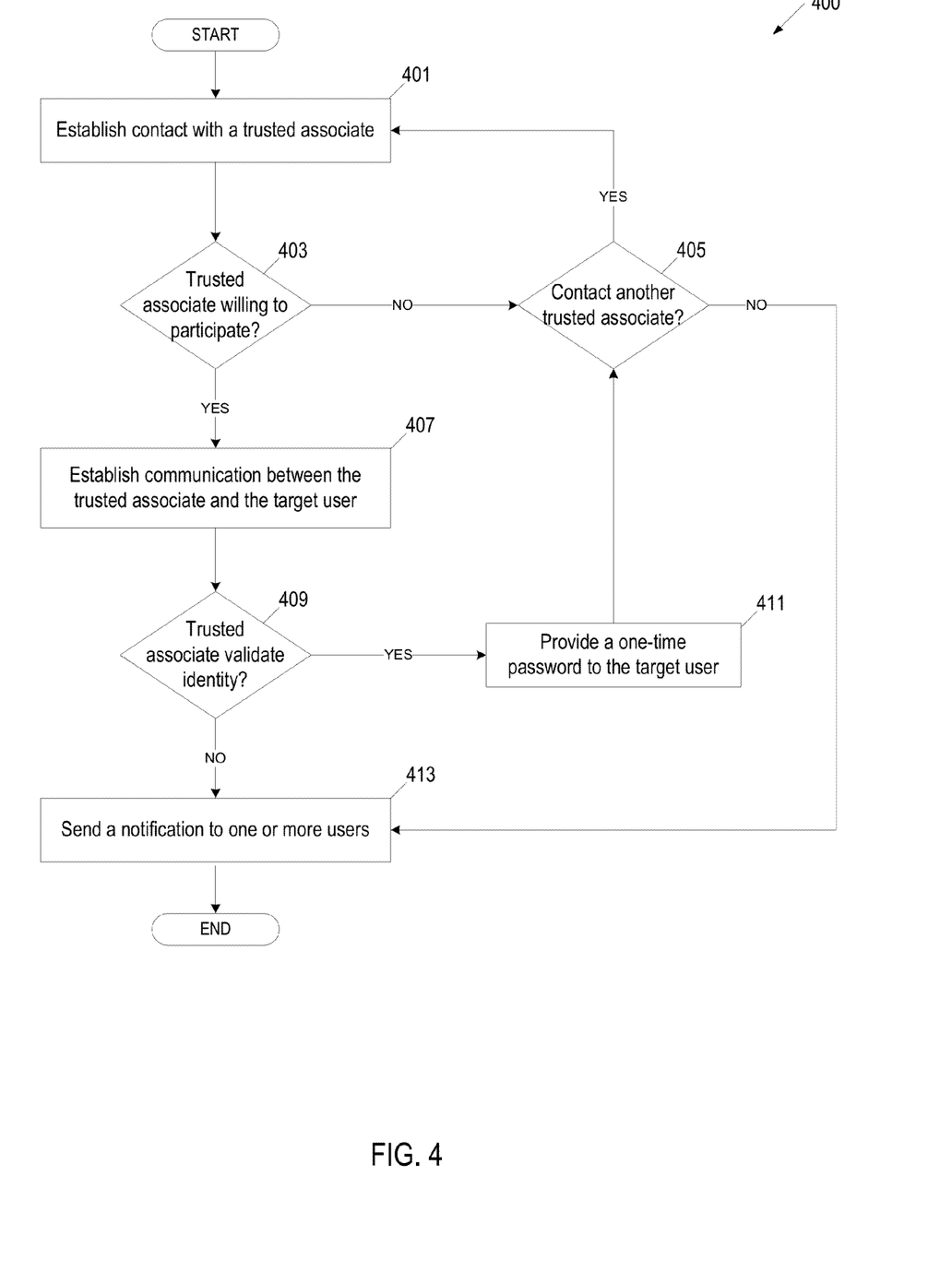
FIG. 4 is a flow diagram of an embodiment of a method for communicating with trusted associates to validate a target user.

FIG. 4 is a flow diagram of an embodiment of a method 400 for communicating with trusted associates to validate a target user. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by an authentication module 161 in FIG. 1.

At block 401, processing logic establishes contact with a randomly selected trusted associate. In one embodiment, contact is established automatically, without any interaction by the target user. In particular, processing logic initiates a call (e.g., voice communication, video communication) to a trusted associate using a call identifier, for example, a telephone number, a video calling identifier, or similar call number, which is stored in user account data in the data store. For instance, processing logic contacts the trusted associate using a mobile phone number, places a video call to the trusted associate using a video call identifier of the trusted associate, and/or places a voice over Internet protocol (VOIP) call to the trusted associate using a VOIP identifier of the trusted associate. In another embodiment, processing logic sends an electronic message (e.g., email message, text message, instant message, social network message) and/or a voicemail message to a trusted associate requesting the trusted associate to call a specific call number (e.g., telephone number, video call number) in order to authenticate the identity of the target user.

At block 403, processing logic determines whether the contacted trusted associate is willing to perform the authentication of the identity of the target user. Processing logic can request the trusted associate to participate, for example, via a speech synthesizer and present various menu options to allow the trusted associate to indicate whether or not he/she is willing to participate. In one embodiment, processing logic communicates privately with the trusted associate to determine whether the target associate is willing to participate. A private communication between processing logic and a trusted associate is a communication without any other party connected other than the trusted associate. Processing logic can receive input of the menu selection of the trusted associate. If the trusted associate is not willing to participate (block 403), processing logic determines whether to contact another trusted associate at block 405. For example, the trusted associate may not have time to participate. Processing logic can be configured with a threshold number of trusted associates to contact. The threshold may be a minimum number and/or a maximum number of trusted associates that can be contacted. For example, processing logic may be configured to contact at least four trusted associates, but no more than twenty trusted associates.

If another trusted associate is not to be contacted (block 405), processing logic can send a notification to one or more users at block 413. For example, processing logic has contacted the maximum number of trusted associates and notifies the target user that the authentication session has ended. Examples of the notification can include, and are not limited to, a voice message, text message, instant message, and/or email message. If another trusted associate can be contacted (block 405), processing logic randomly selects another trusted associate and establishes contact with the trusted associate at block 401. If the trusted associate is willing to participate (block 403), processing logic establishes communication between the trusted associate and the target user at block 407. For example, processing logic conferences the trusted associate into a call with the target user via phone and/or video.

At block 409, processing logic determines whether the trusted associate has validated the target user identity. For example, a trusted associate may validate the user identity by asking a question to the target user during the call and receive a correct answer from the target user. The answer to the question may be known to the trusted associate and the target user. Processing logic can receive user input from a trusted associate indicating whether or not the trusted associate has validated the identity of the target user. Processing logic can receive the user input via voice recognition, detecting a touch tone menu selection via a phone call, receiving a text message, and detecting an Internet event, such as detecting a selection of a button on a website. Processing logic can generate a user interface (e.g., website GUI) to receive the user input from a trusted associate. For example, the trusted associate may ask the target user to name the restaurant they dined at last Tuesday or the movie they watched together last weekend. Upon receiving an answer, the trusted associate can select a menu option, such as pressing 1 in the touch tone pad of a mobile device, to indicate that the target user identity was validated.

If the trusted associate did not validate the target user identity (block 409), processing logic sends a notification to one or more users at block 413. The notification can indicate that the trusted associate did not validate the user identity. The notification can be, for example, and is not limited to, a voice message, text message, instant message, and/or email message. In one embodiment, processing logic removes the trusted associate from communicating with the target user and sends the notification to the target user in a private communication.

If the trusted associate validated the identity of the target user (block 409), processing logic provides a one-time password to the target user at block 411 and returns to block 405 to determine whether to contact another trusted associate. Processing logic can privately communicate with the target user to deliver the one-time password. For example, processing logic can disconnect a trusted associate from a call with the target user to deliver the OTP to only the target user. In one embodiment, processing logic generates the OTPs that are delivered to the user. In another embodiment, processing logic receives the OTPs from an enterprise authentication system and distributes the OTPs to the user. Processing logic can deliver the OTP via, for example, and not limited to, text message, mobile device application, instant message, website, email, voice message, and voice application. For example, processing logic can execute a speech synthesizer to recite the one-time password to the target user during a private call.

Figure 5:
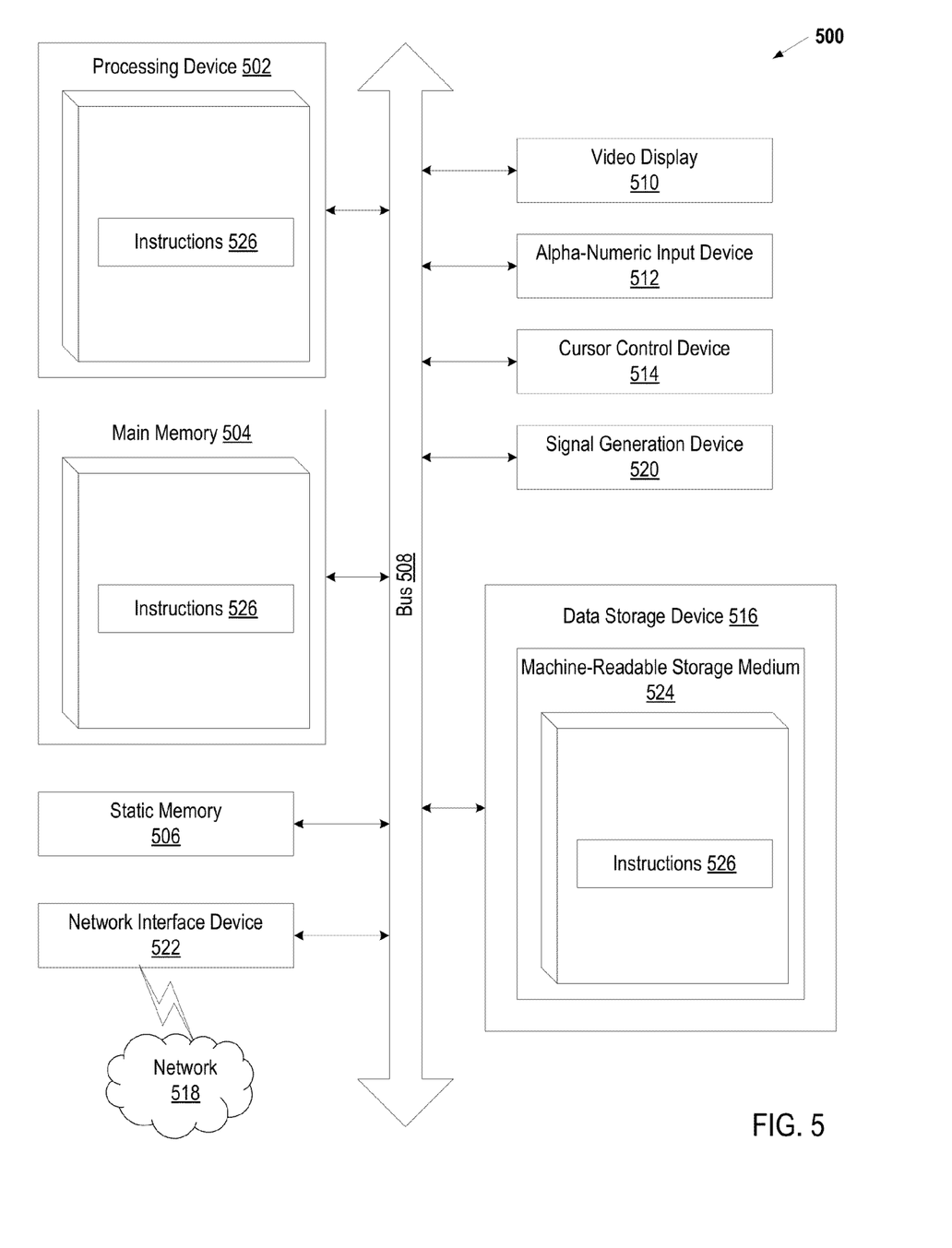
FIG. 5 is a diagram of one embodiment of a computer system for providing automated human assisted authentication.

FIG. 5 is a diagram of one embodiment of a computer system for providing automated human assisted authentication. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The instructions 526 may further be transmitted or received over a network 518 via the network interface device 522.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein (for example in relation to FIG. 2) can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "contacting," "determining," "providing," "establishing," "granting," "selecting," "removing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing automated human assisted authentication is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a server computing system programmed to perform the following, comprising:
   receiving, by the server computing system, a request to initiate a human-assisted authentication of identity of a user;
   automatically contacting a plurality of trusted associates of the user based on policy data in response to the request, wherein the plurality of trusted associates ace humans identified in the policy data to be contacted to validate the identity of the user, wherein the automatically contacting the plurality of trusted associates comprises:
      selecting one of the plurality of trusted associates out of the plurality of trusted associates based on user account data;
      establishing a first private communication between the server computing system and the on associate of the plurality of trusted associates without interaction by the user, wherein the first private communication is a communication without any other party connected other than the on associate; and
      establishing a second communication between the server computing system, the user and the one associate;
   determining whether the plurality of trusted associates validate the identity of the user, wherein the determining comprises receiving an input from the one associate indicating whether or not the identity of the user is validated during the second communication, wherein the validation is based on receiving a correct answer from the user to a question asked by the one associate; and
   providing one-time passwords to the user for trusted associates that have validated the identity of the user, wherein the one-time passwords provided to the user are subsequently combined to form an authentication password used to determine whether the user is allowed to perform an action.

2. The method of claim 1, wherein determining whether the plurality of trusted associates validate the identity of the user comprises:
   establishing independent communication between each of the plurality of trusted associates with the user; and
   receiving user input from a trusted associate of the plurality of trusted associates.

3. The method of claim 2, wherein establishing independent communication between each of the plurality of trusted associates with the user comprises
   establishing at least one of voice communication between the trusted associate with the user or video communication between the trusted associate with the user.

4. The method of claim 1, further comprising:
   receiving user input of the one-time passwords collected by the user;
   determining whether the received one-time passwords match one-time passwords stored in a data store; and
   granting authorization to the user to perform an action based on a determination that there is a match and denying authorization to the user to perform an action based on a determination that there is not a match.

5. The method of claim 1, wherein the automatically contacting the plurality of trusted associates for the user based on policy data comprises
   establishing at least one of voice communication with a trusted associate of the plurality of trusted associated or video communication with the trusted associate.

6. The method of claim 1, wherein providing the one-time passwords to the user comprises
   removing a trusted associate of the plurality of trusted associates from communication with the user to establish private communication between the server computing system and the user to deliver the one-time passwords to the user.

7. A system comprising:
   a memory to store policy data; and
   a processor coupled with the memory to receive a request to initiate authentication of identity of a user;
   automatically contact a plurality of trusted associates for the user based on the policy data in response to the request, wherein the plurality of trusted associates are humans
   identified in the policy data to be contacted to validate the identity of the user, wherein the processor is to contact the plurality of trusted associates by:
      selecting one of the plurality of trusted associates out of the plurality of trusted associates based on user account data;
      establishing a first private communication between the server computing system and the one associate of the plurality of trusted associates without interaction by the user, wherein the first private communication is a communication without any other party connected other than the one associate; and
      establishing a second communication between the server computing system, the user and the one associate;
   determine whether the plurality of trusted associates validate the identity of the user, wherein the processor is to determine the plurality of trusted associated validate the identity by receiving an input from the one associated indicating whether or not the identity of the user is validated during the second communication, wherein the validation is based on receiving a correct answer from the user to a question asked by the one associate; and
   provide one-time passwords to the user for trusted associates that have validated the identity of the user, wherein the one-time passwords provided to the user are subsequently combined to form an authentication password used to determine whether the user is allowed to perform an action.

8. The system of claim 7, wherein the processor is to determine whether the plurality of trusted associates validate the identity of the user by:
    establishing independent communication between each of the plurality of trusted associates with the user; and
    receiving user input from a trusted associate of the plurality of trusted associates.

9. The system of claim 8, wherein the processor is to establish independent communication between each of the plurality of trusted associates with the user comprises
    establishing at least one of voice communication between the trusted associate with the user or video communication between the trusted associate with the user.

10. The system of claim 7, wherein the processor is further to:
    receive user input of the one-time passwords collected by the user;
    determine whether the received one-time passwords match one-time passwords stored in a data store; and
    grant authorization to the user to perform an action based on a determination that there is a match and denying authorization to the user to perform an action based on a determination that there is not a match.

11. The system of claim 7, wherein the processor is to automatically contact the trusted associates for the user based on policy data by establishing at least one of voice communication with a trusted associate or video communication with a trusted associate.

12. The system of claim 7, wherein the processor is to provide the one-time passwords to the user by removing a trusted associate from communication with the user to establish private communication between the system and the user to deliver the one-time passwords to the user.

13. A non-transitory computer readable storage medium including instructions that, when executed by a processor, cause the processor to perform operations comprising:
    receiving, by the processor, a request to initiate a human-assisted authentication of identity of a user;
    automatically contacting a plurality of trusted associates of the user based on policy data in response to the request, wherein the plurality of trusted associates are humans identified in the policy data to be contacted to validate the identity of the user, wherein the automatically contacting the plurality of trusted associates comprises:
    selecting one of the plurality of trusted associates out of the plurality of trusted associates based on user account data;
    establishing a first private communication between the processor and the one associate of the plurality of trusted associates without interaction by the user, wherein the first private communication is a communication without any other party connected other than the one associate; and
    establishing a second communication between processor, the user and the one associate;
    determining whether the plurality of trusted associates validate the identity of the user:
    wherein the determining comprises receiving an input from the one associate indicating whether or not the identity of the user is validated during the second communication, wherein the validation is based on receiving a correct answer from the user to a question asked by the one associate: and
    providing one-time passwords to the user for trusted associates that have validated the identity of the user, wherein the one-time passwords provided to the user are subsequently combined to form an authentication password used to determine whether the user is allowed to perform an action
    receiving a request to initiate authentication of identity of a user;
    automatically contacting, by the processor, a plurality of trusted associates for the user based on policy data in response to the request, wherein the plurality of trusted associates are humans identified in the policy data to be contacted to validate the identity of the user;
    determining whether the trusted associates validate the identity of the user; and
    providing one-time passwords to the user for trusted associates that have validated the identity of the user, wherein the one-time passwords provided to the user are subsequently combined to form an authentication password used to determine whether the user is allowed to perform an action.

14. The non-transitory computer readable storage medium of claim 13, wherein determining whether the trusted associates validate the identity of the user comprises:
    establishing independent communication between each of the trusted associates with the user, wherein the independent communication is at least one of voice communication between a trusted associate with the user or video communication between a trusted associate with the user; and
    receiving user input from the trusted associates.

15. The non-transitory computer readable storage medium of claim 13, further comprising:
    receiving user input of the one-time passwords collected by the user;
    determining whether the received one-time passwords match one-time passwords stored in a data store; and
    granting authorization to the user to perform an action based on a determination that there is a match and denying authorization to the user to perform an action based on a determination that there is not a match.

16. The non-transitory computer readable storage medium of claim 13, wherein the automatically contacting the trusted associates for the user based on policy data comprises
    establishing at least one of voice communication with a trusted associate or video communication with a trusted associate.

17. The non-transitory computer readable storage medium of claim 13, wherein providing the one-time passwords to the user comprises
    removing a trusted associate from communication with the user to establish private communication between the processor and the user to deliver the one-time passwords to the user.

* * * * *

UNITED STATES PATENT AND TRADEMARK OFFICE
CERTIFICATE OF CORRECTION

| | | |
|---|---|---|
| PATENT NO. | : 8,832,788 B1 | Page 1 of 1 |
| APPLICATION NO. | : 13/286989 | |
| DATED | : September 9, 2014 | |
| INVENTOR(S) | : Douglas E. Gibson et al. | |

It is certified that error appears in the above-identified patent and that said Letters Patent is hereby corrected as shown below:

In the Claims

In claim 5, column 14, line 25, delete "associated" and insert --associates--

In claim 7, column 14, line 58, delete "associated" and insert --associates--

In claim 7, column 14, line 59, delete "associated" and insert --associates--

Signed and Sealed this
Twenty-fourth Day of February, 2015

Michelle K. Lee
*Deputy Director of the United States Patent and Trademark Office*